April 28, 1970  C. F. ANDREN  3,509,449
DISSIPATIVE VOLTAGE REGULATOR
Filed Oct. 13, 1967  2 Sheets-Sheet 1

INVENTOR
CARL F. ANDREN

BY
ATTORNEY

April 28, 1970  C. F. ANDREN  3,509,449
DISSIPATIVE VOLTAGE REGULATOR
Filed Oct. 13, 1967

INVENTOR
CARL F. ANDREN

United States Patent Office 3,509,449
Patented Apr. 28, 1970

3,509,449
DISSIPATIVE VOLTAGE REGULATOR
Carl F. Andren, Laurel, Md., assignor, by mesne assignments, to the United States of America as represented by the Secretary of the Navy
Filed Oct. 13, 1967, Ser. No. 675,254
Int. Cl. G05f *1/56;* H02m *3/14*
U.S. Cl. 323—22                              2 Claims

ABSTRACT OF THE DISCLOSURE

A voltage regulator circuit of the solid state variety whose output, by means of a feedback loop, is made to be self-controlling. The output of said circuit is sensed and is compared with a fixed reference voltage. The difference in voltage between the output and the fixed reference is amplified and effectively utilized to regulate the impedance of the unregulated voltage supply to provide for a regulated voltage output. A resistor network in the output sensor ensures continuous sampling of the output.

BACKGROUND OF THE INVENTION

Field of the invention

The subject invention relates to the art of solid state voltage regulating circuits. More particularly, the subject inveniton relates to a voltage regulator circuit whose output is automatically maintained at a predetermined value by means of a feedback loop originating at the output of said circuit—said loop being capable of controlling the amount of circuit current reaching the load.

Description of the prior art

In the past, there have been designed some voltage regulators which exhibit high precision, others which exhibit high efficiency, considerable flexibility or a capability of operating over a large temperature range, and still others which have the capability of regulating unlimited currents or protecting against various regulator failures; but there has never been designed a regulator which exhibits all of the above-noted advantages. It has been the experience that when a regulator is designed with one or more of these advantages in mind, others are necessarily sacrificed. Therefore, a perusal of the prior art in search for a precise and highly efficient voltage regulator which is both versatile and capable functioning under widely varying temperature conditions, which can regulate unlimited currents, and which can protect against regulator failures, is apt to prove fruitless.

SUMMARY OF THE INVENTION

The subject invention relates to a voltage regulator which is flexible, highly precise and extremely efficient, and which is further capable of operating under highly varying temperature conditions as well as having the capabilities of regulating unlimited currents and protecting against malfunctions in the regulator. More particularly, the subject regulator is capable of regulating within 1% and has a very low rate of power dissipation. Furthermore, the regulator maintains its accuracy and efficiency within temperatures ranging from —55° C. to +125° C. and, if equipped with simple and easily adaptable components, can regulate unlimited currents. Additionally, the instant regulator is equipped with means for protecting the load against the regulator sticking in its open or in its shorted mode; and therefore, the regulator proves to be extremely suitable for applications wherein the supply of power to the load is more important than the provision of a regulated voltage.

It is therefore an object of the invention to provide a high-precision voltage regulator.

It is another object of the invention to provide a highly efficient voltage regulator.

It is a further object of the invention to provide a voltage regulator which can regulate unlimited currents.

It is still another object of the invention to provide a voltage regulator which protects the load against regulator malfunctions.

These and other objects of the invention, and many of the attendant advantages thereof, will become apparent when reference is made to the following discussion taken in conjunction with the accompanying drawings.

DESCRIPTION OF THE PREFERRED EMBODIMENTS

Figure 1:
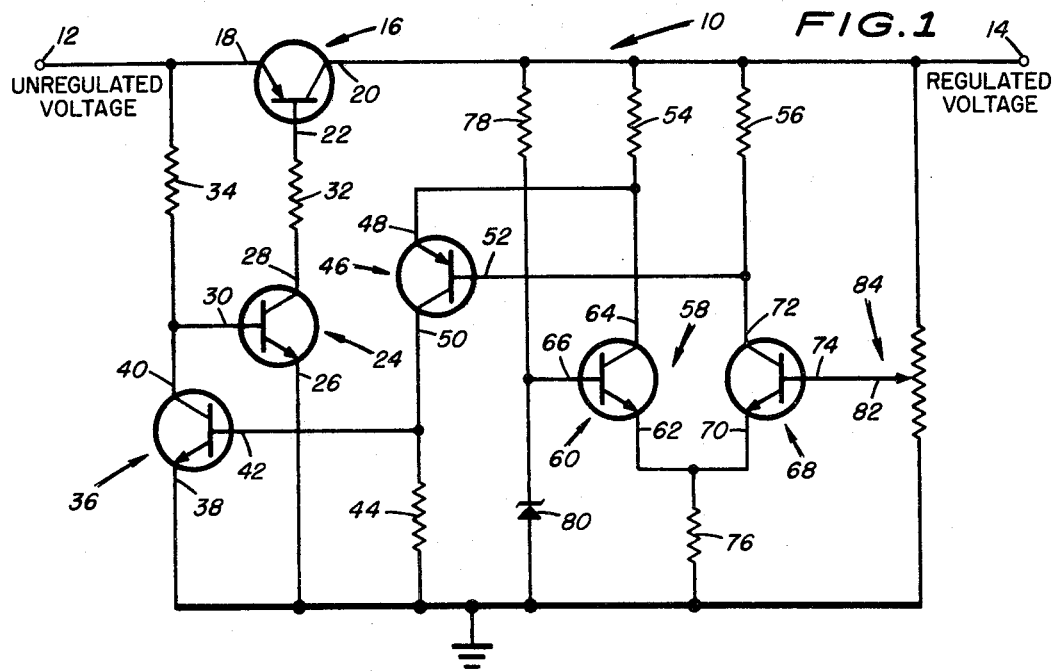
FIG. 1 is a circuit schematic of the basic voltage regulator of the subject invention.

With reference now to FIG. 1, which is a basic circuit schematic of the subject voltage regulator, an explanation of the physical configuration of the circuit is first given, following which is given an explanation of the operation of said circuit. The subject voltage regulator is shown generally at 10 and has an input terminal 12 and an output terminal 14. Intermediate the input terminal 12 and the output terminal 14 is a PNP transistor 16 having an emitter 18, a collector 20 and a base 22. The emitter 18 and the collector 20 of transistor 16 serves as the input terminal 12 and the output terminal 14, respectively; and thus it is evident that the conductivity of transistor 16 controls the amount of current which is allowed to pass from the input terminal 12 to the output terminal 14. Therefore, transistor 16 will hereinafter be termed the pass transistor.

Associated with pass transistor 16, and controlling the conductivity thereof, is an NPN transistor 24 having an emitter 26, a collector 28 and a base 30. The emitter 26 is connected to ground; the collector 28 is connected, through a resistor 32, to the base 22 of pass transistor 16; and the base 30 is connected, through a resistor 34, to the input terminal 12. Since it is transistor 24 which controls the conductivity of pass transistor 16, transistor 24 will hereinafter be termed the control transistor.

Associated with the control transistor 24, and regulating the bias thereon, is an NPN transistor 36 having an emitter 38, a collector 40 and a base 42. The emitter 38 is connected to ground; the collector 40 is connected to the base 30 of control transistor 24 and is further connected to the input terminal 12 through resistor 34; and the base 42 is connected to one lead of a resistor 44, the other lead of which is connected to ground. Since transistor 36 controls the bias on transistor 24, transistor 36 will hereinafter be termed the bias transistor.

Controlling the amount of current which flows through resistor 44, and hence controlling the voltage developed thereacross, is a PNP transistor 46 having an emitter 48, a collector 50 and a base 52. The emitter 48 is connected to the output terminal 14 through a resistor 54;

the collector 50 is connected to the base 42 of the bias transistor 36, and is further connected to resistor 44; and the base 52 is connected to the output terminal 14 through a resistor 56. For reasons which will hereinafter become evident, transistor 46 will hereinafter be termed the error-amplifying transistor.

Associated with the error-amplifying transistor 46, and controlling the conductivity thereof, is a differential amplifier shown generally at 58. The differential amplifier 58 comprises a first NPN transistor 60 having an emitter 62, a collector 64 and a base 66, and a second NPN transistor 68 having an emitter 70, a collector 72 and a base 74. The emitter 62 of transistor 60 and the emitter 70 of transistor 68 form a common junction at one lead of a resistor 76, the other lead of which is connected to ground. The collector 64 of transistor 60 and the collector 72 of transistor 68 are connected to the output terminal 14 through resistors 54 and 56, respectively. The base 66 of transistor 60 is connected to the output terminal 14 through a resistor 78 and is further connected to one terminal of a Zener diode 80, the other terminal of which is connected to ground. The base 74 of transistor 68 is connected to a tap 82 of a variable resistor shown generally at 84, the end terminals of said variable resistor being connected between the output terminal 14 and ground.

Before a detailed discussion of the operation of the subject voltage regulator is undertaken, three details need be discussed. First, the Zener diode 80 is a device across which a constant voltage appears irrespective of the current flowing therethrough. Second, tap 82 is positioned at or near the center of the variable resistor 84 under normal operating conditions. And third, all the transistors in the voltage regulator are in their conductive states when the unregulated voltage, which is impressed upon input terminal 12, is of a value equal to the desired regulated voltage which is to be extracted from the output terminal 14.

With continuing reference to FIG. 1, the operation of the voltage regulator 10 will now be discussed. Briefly, an unregulated voltage is impressed upon input terminal 12 and biases control transistor 24 which, in turn, biases pass transistor 16 in such a manner that both control transistor 24 and pass transistor 16 become conductive. When pass transistor 16 is conductive, it is obvious that current flows from the input terminal 12 through pass transistor 16 and into a load (not shown) which is connected to the output terminal 14, thus causing a voltage to appear at said terminal. The differential amplifier 58 then compares a sample of the output voltage with the Zener diode reference voltage and feeds the voltage difference (error) to the error-amplifying transistor 46. Depending upon the signal received from the differential amplifier 58, the error-amplifying transistor 46 causes a voltage to appear across resistor 44. The magnitude of the voltage across resistor 44 determines the conductivity of the pass transistor 16 varying the conductivity of the bias transistor 36 which, in turn, determines the conductivity of the control transistor 24.

A detailed description of the operation of voltage regulator 10 will now be undertaken, while assuming that the voltage appearing at the output terminal 14 is greater in magnitude than the desired regulated voltage. When this situation occurs, the voltage on the base 74 of transistor 68 tends to increase, and therefore tends to be higher in value than the voltage on the base 66 of transistor 60— the voltage on base 66 being the constant voltage drop across the Zener diode reference. When the voltage on the base 74 of transistor 68 tends to increase, the transistor 68 tends to become conductive, thereby causing the voltage drop across resistor 56 to increase. When the voltage drop across resistor 56 increases relative to the voltage drop across resistor 54, the voltage appearing on the base 52 of the error-amplifying transistor 46 tends to decrease relative to the voltage appearing on the emitter 48 of said error-amplifying transistor, thereby causing said error-amplifying transistor to become more conductive. When the error-amplifying transistor 46 becomes more conductive, the voltage drop across resistor 44 tends to increase, thereby increasing the voltage difference between the base 42 and the emitter 38 of the bias transistor 36, and thereby increasing the conductivity of said bias transistor. When the conductivity of bias transistor 36 is caused to increase, the voltage drop across resistor 34 increases proportionately, thereby decreasing the voltage on the base 30 of control transistor 24, and thereby decreasing the conductivity of said control transistor; and when the conductivity of said control transistor decreases, the emitter-to-base current of the pass transistor 16 decreases since the base current path experiences an increased impedance. As a result of the decrease in the emitter-to-base current of pass transistor 16, said pass transistor becomes less conductive. And finally, when said pass transistor becomes less conductive, it is obvious that the voltage appearing at the output terminal 14 decreases since less current is allowed to flow into the load.

The operation of the voltage regulator 10, when the voltage appearing at the output terminal 14 is equal to the desired regulated voltage or when the voltage appearing at terminal 14 is less than the desired regulated voltage, is merely an exension of the above discussion, and therefore a detailed description of the circuit operation under these latter conditions is omitted.

Figure 2:
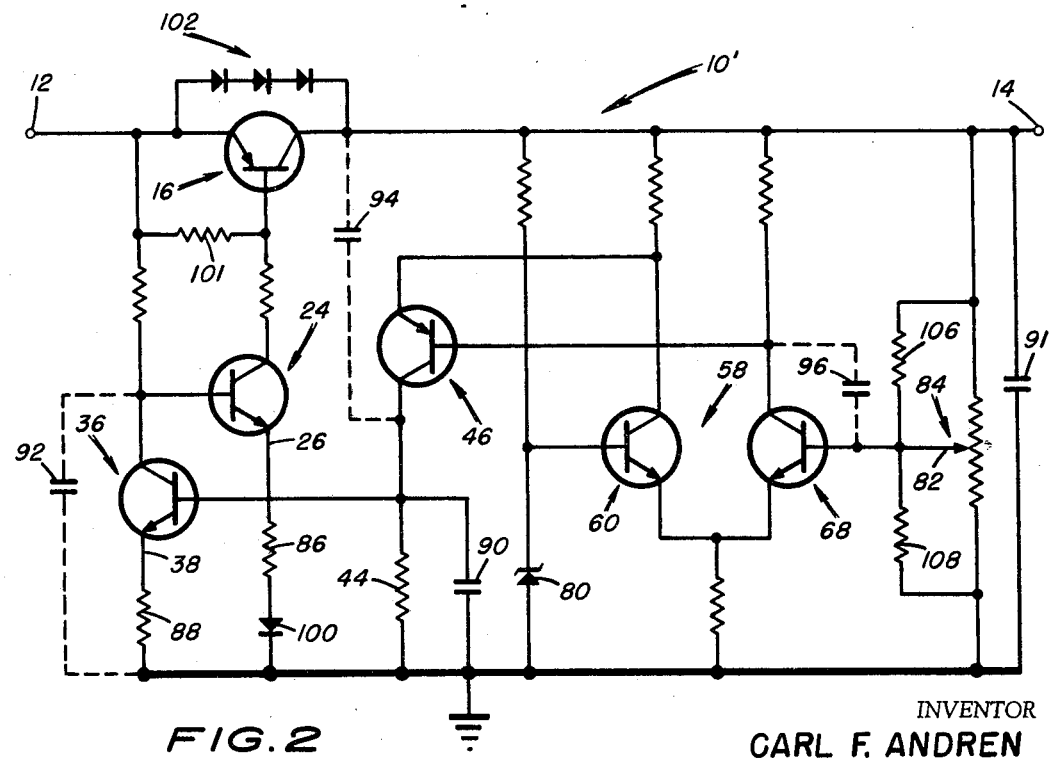
FIG. 2 is a circuit schematic of a second embodiment of the subject voltage regulator including many improvements over the FIG. 1 regulator.

With reference now to FIG. 2, an attempt will be made to uncover a few of the less obvious means by which the characteristics of the FIG. 1 voltage regulator can be improved. Since the voltage regulator shown in FIG. 2 is so closely akin to that regulator shown in FIG. 1, corresponding elements are similarly referenced and only a discussion of the improvements is undertaken. But before commencing a discussion of some possible improvements over the FIG. 1 embodiment of the voltage regulator, it should be stressed that the following discussion is in no manner intended to be limiting, but intended only to point out to those skilled in the art that certain improvements are readily adaptable to the basic circuit of the instant invention.

A second embodiment of the subject voltage regulator is shown at 10' and has an input terminal 12 and an output terminal 14. Just as in the regulator shown in FIG. 1, this second embodiment comprises a pass transistor 16, a control transistor 24, a bias transistor 36, an error-amplifying transistor 46 and a pair of transistors 60 and 68 forming a differential amplifier 58.

It has been the experience that oscillations may occur in the general circuit shown in FIG. 1. These oscillations are due to two factors. First, by connecting the respective emitters of control transistor 24 and bias transistor 36 directly to ground, the overall gain of the circuit is somewhat unpredictable; and when the circuit gain reaches certain values, the circuit tends to oscillate. And second, when no active steps are taken to control the roll-off response of the FIG. 1 regulator, it is possible that the roll-off response will be such that circuit oscillations occur at certain levels of gain.

To avoid circuit oscillations caused by an unpredictable gain response, emitter degeneration resistors are provided to connect the respective emitters of transistors 24 and 36 to ground. More particularly, connecting the emitter 26 to ground is a degeneration resistor 86; and connecting the emitter 38 to ground is a degeneration resistor 88. The function of the emitter degeneration resistors 86 and 88 is to reduce the overall gain of the circuit; and when the circuit gain is reduced, the circuit is less apt to oscillate.

To avoid circuit oscillations caused by an unstable roll-off response, roll-off capacitors are inserted into the circuit. More particularly, a roll-off capacitor 90 is connected across resistor 44, and a roll-off capacitor 91 is connected between the output terminal 14 and ground. The function of the roll-off capacitor 90 is to initiate heavy roll-off before the circuit capacitance, both lumped and inherent, causes said circuit to oscillate; and the function of the roll-off capacitor 91 is to aid in the initiation of heavy roll-off and additionally, to provide the circuit with a low output impedance at all frequencies. It should be noted though, that the position of the roll-off capacitor 90 can be other than that position shown in FIG. 2. More particularly, the roll-off capacitor 90 can be introduced into the circuit in any of the positions shown, in dotted lines, by capacitor 92 connected between the collector of transistor 36 and ground, capacitor 94 connected between the output terminal 14 and the collector of transistor 46, and capacitor 96 connected between the collector and the base of transistor 68.

It has further been the experience that at high temperatures, leakage makes it difficult to reduce the base-to-emitter voltage of the control transistor 24 to zero. It has been found though, that this shortcoming can be overcome by placing a diode intermediate the emitter 26 of the control transistor 24 and ground. In FIG. 2, this diode is shown at 100. Therefore, even at high temperatures, the base-to-emitter voltage of the control transistor 24 can be brought from a positive value down to zero, thereby changing the state of control transistor 24 from conductive to nonconductive.

It has also been found that during light load conditions, there tends to be a certain amount of leakage in the pass transistor. To reduce the effects of the resultant leakage current, a leakage swamping resistor 101 is connected between the emitter junction and the base junction of transistor 16. The function of the leakage swamping resistor is to provide a path for current leaking from the collector to the base of transistor 16—said path diverting leakage current in such a manner that said leakage current does not add substantially to the base current in transistor 16.

In many fields, such as in the field of satellites, though a regulated power supply is desirable, it is often more desirable to avoid total disability of the power source. Therefore, the subject voltage regulator is adapted so that if said regulator malfunctions, the unregulated power source is not totally disabled, but continues to function as though the regulator were not in the circuit at all. More particularly, the subject voltage regulator is equipped with diode means for over-riding the effect of the pass transistor 16, should said pass transistor stick in its nonconductive state. Referring again to FIG. 2, there are shown diodes 102 shunting the emitter-to-collector path of the pass transistor 16. Diodes 102 are chosen so that under normal operating conditions the emitter-to-collector voltage of the pass transistor 16 is not of a value sufficient to cause diodes 102 to conduct; but said voltage is of a value sufficient to cause diodes 102 to conduct if transistor 16 becomes nonconductive. Therefore, under normal operating conditions, when the pass transistor 16 is passing circuit current, diodes 102 are nonconductive and do not affect the operation of the regulator; but if the pass transistor 16 sticks in its nonconductive state, a voltage is developed across pass transistor 16 sufficient to cause diodes 102 to conduct, and therefore circuit current flows from the input terminal 12 through diodes 102 to the output terminal 14, completely bypassing transistor 16. Though it is true that when the pass transistor 16 sticks in its nonconductive mode and when diodes 102 over-ride said pass transistor, the output appearing at terminal 14 is unregulated, it is often more important to have an unregulated output than no output at all.

A second element of the instant regulator which is particularly susceptible to malfunctions is the variable resistor 84 connected between the output terminal 14 and ground. In particular, it has been the experience that under severe environmental conditions, the tap 82 may become disengaged from the main portion of the resistor 84; and therefore, the base of transistor 68 may receive no sample of the output voltage. It should be obvious that when the output appearing at terminal 14 is unsensed by transistor 68, the voltage regulator is disabled. Therefore, means are provided to protect against open circuiting in the variable resistor 84. More particularly, a first bridging resistor 106 is connected between the output terminal 14 and the base of transistor 68, and a second bridging resistor 108 is connected between the base of transistor 68 and ground. The function of bridging resistors 106 and 108 is to provide transistor 68 with a sample of the voltage appearing at output terminal 14, even in the absence of resistor 84. The values of bridging resistors 106 and 108 are chosen so that the combined action of said bridging resistors and the variable resistor 84 provides the differential amplifier 58 with precise information regarding the circuit output under normal operating conditions. It is obvious, since the circuit is designed to operate properly when all of the resistors 84, 106 and 108 form part of the regulator circuit, that the output appearing at terminal 14 when resistor 84 is disabled is only an approximation of the desired regulated voltage. But again, it is more desirable to have an approximation of the desired regulated voltage than no voltage at all.

In conclusion, the voltage regulator of FIG. 2 is a device which operates properly under a wide range of temperatures, avoids circuit oscillations, protects the unregulated power supply from a failure in the regulator circuit, and which gives an approximation of the desired regulated output even if said circuit should malfunction.

As noted above, the regulators shown in FIGS. 1 and 2 are extremely temperature stable when compared with the presently known prior art regulators. It has been found, though, that the temperature stability can be increased still further. More particularly, it has been found that by removing the error-amplifying stage of the instant regulator, even the high degree of temperature stability already present in the FIG. 1 and the FIG. 2 regulators is improved. Though it is true that when the error-amplifying stage is removed, and advantage is removed, there are many applications wherein temperature stability is more important than the advantage brought about by the presence of the error-amplifying stage; and therefore, there are many applications wherein it is beneficial to remove said error-amplifying stage.

Figure 3:
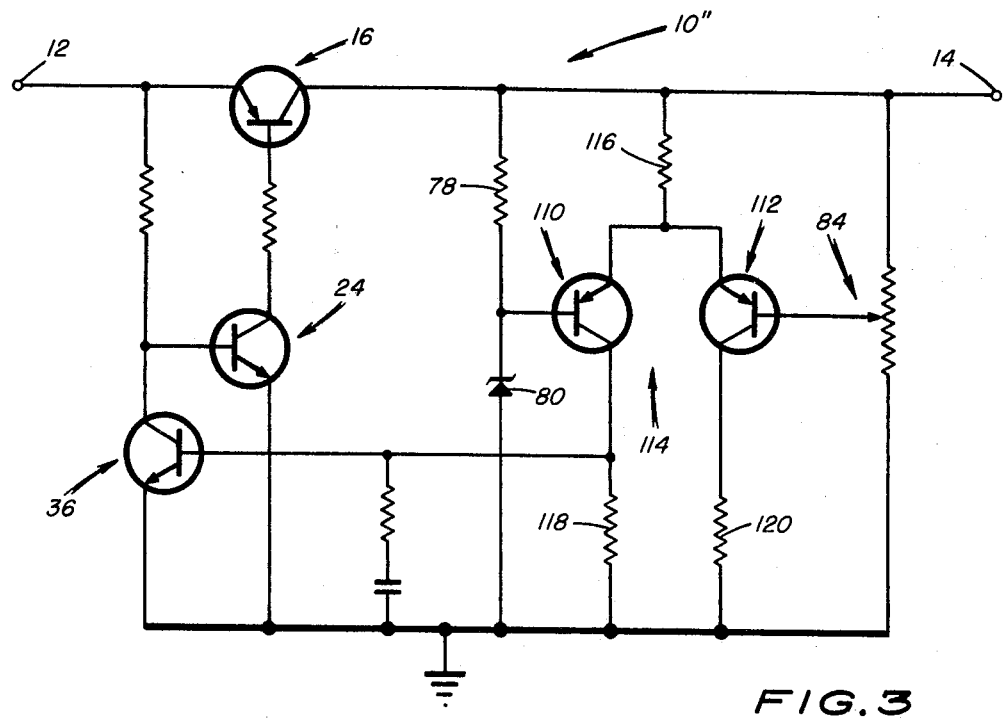
FIG. 3 is a circuit schematic of a third embodiment of the subject voltage regulator.

With reference, then, to FIG. 3, there is shown a voltage regulator 10'' which incorporates the above suggestion regarding the removal of the error-amplifying stage. Since the regulator of FIG. 3 is so like the regulator of FIG. 1, like elements are similarly referenced and only the differences therebetween will be discussed. The regulator 10'' comprises an input terminal 12, an output terminal 14, a pass transistor 16, a control transistor 24, a bias transistor 36, and a pair of PNP transistors 110 and 112 which make up a differential amplifier shown generally at 114. The respective emitters of transistors 110 and 112 form a common junction at one terminal of a resistor 116, the other terminal of which is connected to the output terminal 14; and the collectors of transistors 110 and 112 are connected to ground through resistors 118 and 120, respectively. To complete the connection of the differential amplifier 114 into the regulator circuit, the base of transistor 110 is connected to the junction formed by the resistor 78 and the Zener diode 80, the base of transistor 112 is connected to the center tap of the variable resistor 84, and the collector of transistor 110 is further connected to the base of the bias transistor 36.

As explained above, since the FIG. 3 regulator lacks an error-amplifying stage, the regulator exhibits a higher degree of temperature stability than do the regulators of FIGS. 1 and 2. Though the FIG. 3 regulator lacks a stage when compared with the FIG. 1 and the FIG. 2 regulators, the operation is substantially identical, and therefore a detailed description thereof is omitted. It should be noted, though, that while the differential amplifiers of the FIG. 1 and FIG. 2 regulators make use of NPN transistors, the differential amplifier of the FIG. 3 regulator makes use of PNP transistors. The reason for this alteration is that a compensation must be made for the lack of phase inversion which would be caused by the inclusion of the error-amplifying stage. It should further be noted that the FIG. 3 regulator is shown in its simplest form, but can be made to incorporate all of the advantages explained with reference to the FIG. 2 regulator.

It has been noted above that the subject regulator is easily adapted for handling unlimited currents. The voltage regulators shown in FIGS. 1, 2 and 3 are of the low-power variety. To convert these regulators to medium or high-power varieties, additional transistors, altering the manner in which the pass transistor is connected into the regulator circuit, are added. The manners in which these additional transistors are incorporated into the circuit are shown in FIGS. 4 and 5.

Figure 4:
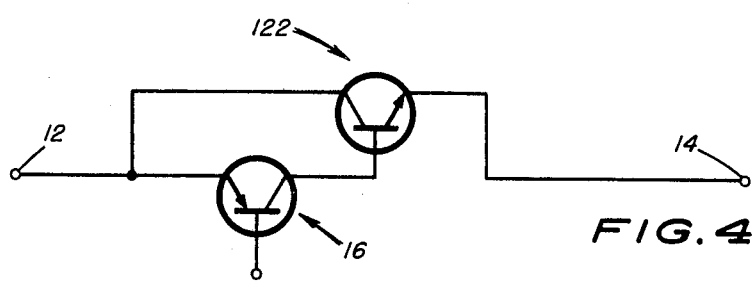
FIG. 4 is a partial circuit schematic showing the components necessary for increasing the current-handling capability of the subject regulator.

Referring to FIG. 4, a partial schematic of a medium-power voltage regulator, there is given an explanation of how the pass transistor is connected into the circuit. For ease of description, there are shown only those parts of the regulator circuit necessary for an understanding of how the power handling capabilities can be varied. More particularly, FIG. 4 shows an input terminal 12, an output terminal 14, a pass transistor 16 and a bridging transistor 122. The collector of bridging transistor 122 is connected to the input terminal 12 and is further connected to the emitter of pass transistor 16; the base of bridging transistor 122 is connected to the collector of pass transistor 16 (which no longer serves as the output terminal 14); and the emitter of bridging transistor 122 is connected to the output terminal 14, thereby serving as said output terminal. When the bridging transistor 122 is connected in this manner, it serves to aid pass transistor 16 in transmitting current from the input terminal 12 to the output terminal 14.

Figure 5:
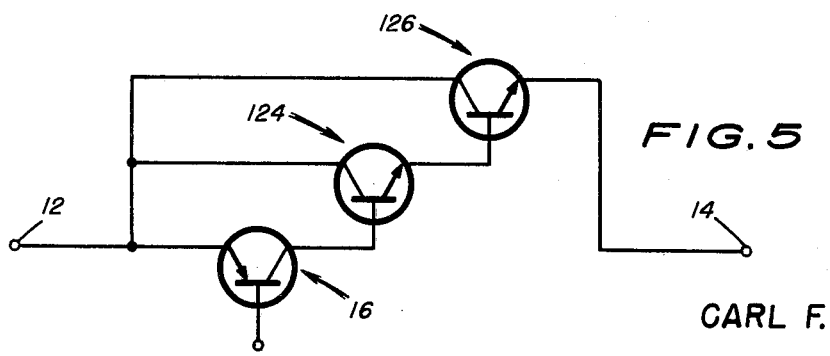
FIG. 5 is a partial circuit schematic showing the components necessary for increasing still further the current-handling capability of the subject regulator.

Referring now to FIG. 5, a partial schematic of a high-power voltage regulator, there is given an explanation of how the pass transistor is connected into the circuit. Again, only the elements necessary for an understanding of how the pass transistor is connected, are shown. In this high-power embodiment, the pass transistor 16 is bridged by two bridging transistors 124 and 126. The collectors of both transistors 124 and 126 are connected to the emitter of the pass transistor 16 and are further connected to the input terminal 12. The base of bridging transistor 124 is connected to the collector of pass transistor 16; and the emitter of bridging transistor 124 is connected to the base of bridging transistor 126. Whereas the collector of pass transistor 16 serves as the output terminal in the FIG. 1, FIG. 2 and FIG. 3 low-power voltage regulators, in a high-power regulator, the emitter of bridging transistor 126 is connected to and serves as the output terminal 14. As was the case in the FIG. 4 bridging transistor, bridging transistors 124 and 126 aid pass transistor 16 in transmitting current from the input terminal 12 to the output terminal 14.

In conclusion, there has been disclosed a voltage regulator which is highly efficient and extremely temperature stable; which regulates unlimited currents and does so with a high degree of precision; and which has means for protecting the load from circuit malfunctions and further has means for avoiding oscillations. In short, there has been disclosed a regulator which exhibits advantages far in excess of the advantages possessed by any single prior art voltage regulator.

It is to be understood that the above-described embodiments and configurations are only illustrative of the applications and principles of the instant invention, and that numerous other embodiments and configurations may be devised by those skilled in the art without departing from the spirit and scope of the invention.

I claim:
1. A voltage regulator circuit comprising
an input terminal for receiving an unregulated voltage;
an output terminal for emitting a regulated voltage;
pass means in the form of a variable impedance connected intermediate said input terminal and said output terminal for regulating the amount of circuit current flowing from said input terminal to said output terminal;
control means associated with said pass means for controlling the impedance of said pass means;
bias means providing a bias for said control means for causing said control means to regulate the impedance of said pass means in response to the bias provided said control means;
output sensing means for developing a voltage proportional to the voltage appearing at said output terminal;
reference means for establishing a voltage whose magnitude is unaffected by circuit conditions;
difference means for recognizing voltage differences between the voltage developed by said output sensing means and the voltage established by said reference means and for issuing output responses dependent upon the magnitude of said voltage differences;
the output responses issued by said difference means controlling the impedance of said pass means through the bias means and the control means respectively, and
the impedance of said pass means being controlled in such a manner that the regulated voltage appearing at said output terminal is caused to remain at a predetermined magnitude;
a variable resistor comprising a first lead, a second lead and a third lead in the form of a tap,
said first lead being connected to said output terminal,
said second lead being connected to ground and said third lead being associated with said difference means;
a first bridging resistor connected between said output and terminal and the third lead of said variable resistor;
a second bridging resistor connected between the third lead of said variable resistor and ground.
2. A voltage regulator circuit comprising
an input terminal for admitting an unregulated voltage;
an output terminal for the extraction of a regulated voltage;
a pass transistor having an emitter, a collector and a base for regulating the amount of circuit current flowing from said input terminal to said output terminal,
said emitter serving as said input terminal,
said collector serving as said output terminal and
said base serving as a control electrode for controlling the emitter-to-collector conductivity of said pass transistor;
a control transistor having an emitter, a collector and a base for controlling the conductivity of said pass transistor,
said collector of said control transistor being connected to the base of said pass transistor in such a manner that the conductivity of said control transistor determines the conductivity of said pass transistor and
the base of the control transistor is biased by said unregulated voltage impressed upon said input terminal;
a bias transistor having an emitter, a collector and a base for controlling the bias on the base of said control transistor,
the collector of said bias transistor being connected to the base of said control transistor and being further connected to said input terminal, the conductivity of said bias transistor determining the bias on the base of said control transistor;

output sensing means for developing a voltage proportional to said regulated voltage appearing at said output terminal;

reference voltage means for establishing a voltage independent of circuit conditions;

differential amplifier means for comparing the voltage developed by said output sensing means with the voltage established by said reference voltage means and for issuing responses dependent upon said comparison;

an error-amplifying transistor having an emitter, a collector and a base said emitter and said base of said error-amplifying transistor being associated with said differential amplifier means in such a manner that the conductivity of said error-amplifying transistor depends upon said responses issued by said differential amplifier means;

a resistor connected to the collector of said error-amplifying transistor and further connected to the base of said bias transistor, the conductivity of said error-amplifying transistor determining the voltage developed across said resistor and the voltage developed across said resistor determining the conductivity of said bias transistor;

a variable resistor having a first lead connected to said output terminal, a second lead connected to ground and a third lead, in the form of a movable tap, connected to said differential amplifier means;

a first bridging resistor connected between said output terminal and the third lead of said variable resistor; and a second bridging resistor connected between the third lead of said variable resistor and ground.

References Cited

UNITED STATES PATENTS

| | | |
|---|---|---|
| 2,889,512 | 6/1959 | Ford et al. |
| 3,323,038 | 5/1967 | Greenberg et al. |
| 3,391,330 | 7/1968 | Grossoehme. |

FOREIGN PATENTS 1,347,950 11/1963 France.

OTHER REFERENCES

J. S. Bell and P. G. Wright: "Stabilized Voltage Supplies Using Transistors," Electronic Engineering, December 1960, p. 760.

LEE T. HIX, Primary Examiner

A. D. PELLINEN, Assistant Examiner

U.S. Cl. X.R.

323—38, 74